(12) United States Patent
Flynn et al.

(10) Patent No.: US 7,017,701 B2
(45) Date of Patent: Mar. 28, 2006

(54) INCLINATION-MEASURING DEVICE

(75) Inventors: Charles L. Flynn, Davisburg, MI (US); Casimir R. Kiczek, Livonia, MI (US)

(73) Assignee: Dura Global Technologies, Inc., Rochester Hills, MI (US)

(*) Notice: Subject to any disclaimer, the term of this patent is extended or adjusted under 35 U.S.C. 154(b) by 0 days.

(21) Appl. No.: 10/300,486

(22) Filed: Nov. 20, 2002

(65) Prior Publication Data
US 2004/0094913 A1   May 20, 2004

(51) Int. Cl.
*G01B 7/00* (2006.01)
*B60K 41/28* (2006.01)
*B60S 9/00* (2006.01)
*B60G 17/00* (2006.01)

(52) U.S. Cl. ............... 180/282; 280/6.153; 324/207.2; 324/207.16; 33/366.24; 33/402; 254/419

(58) Field of Classification Search ............... 180/282; 280/6.153, 6.154, 6.155, 5.507; 324/207.2, 324/207.21, 207.25, 207.16; 33/366.24, 33/402; 340/440, 689; 254/427, 419
See application file for complete search history.

(56) References Cited

U.S. PATENT DOCUMENTS

| | | | |
|---|---|---|---|
| 2,523,962 A * | 9/1950 | Mahaffey et al. ............ 254/419 |
| 3,895,682 A * | 7/1975 | Graham ........................ 254/427 |
| 3,917,295 A * | 11/1975 | Hiruma ..................... 280/5.507 |
| 4,375,727 A * | 3/1983 | McAdams et al. ......... 33/366.24 |
| 4,426,788 A | 1/1984 | Hirose et al. |
| 4,784,400 A | 11/1988 | Hofius |
| 4,887,359 A | 12/1989 | Hofius |
| 4,926,690 A | 5/1990 | Oberg |
| 4,994,741 A * | 2/1991 | Takahashi ............... 324/207.21 |
| 5,285,031 A | 2/1994 | Schueneman |
| 5,417,624 A | 5/1995 | Weissbrich et al. |
| 5,789,917 A | 8/1998 | Oudet et al. |
| 6,027,173 A | 2/2000 | Bettini |
| 6,366,024 B1 | 4/2002 | Jonner et al. |
| 6,470,580 B1 * | 10/2002 | Ushihara et al. ............ 180/282 |
| 6,518,751 B1 * | 2/2003 | Bujak ..................... 324/207.21 |

* cited by examiner

*Primary Examiner*—Ruth Ilan
(74) *Attorney, Agent, or Firm*—Dean B. Watson; Charlie Kiczek

(57) ABSTRACT

An inclination-measuring apparatus for use with a motor vehicle includes a rotary sensor connected to the motor vehicle, the rotary sensor selected from one of a rotary position sensor and a rotary angle sensor, a pendulum and a controller. The pendulum has a pendulous mass being oriented to hang substantially aligned with the earth's gravitational forces. The movement of the pendulum providing an input to the rotary sensor to generate a signal to ascertain the inclination of the vehicle relative to the earth's gravitational forces. The signal is processed by the controller that is operatively connected to control one of an electric park brake, a chassis leveling device while parked, a lateral inclination device while the vehicle is operational and a longitudinal inclination device while the vehicle is operational.

15 Claims, 10 Drawing Sheets

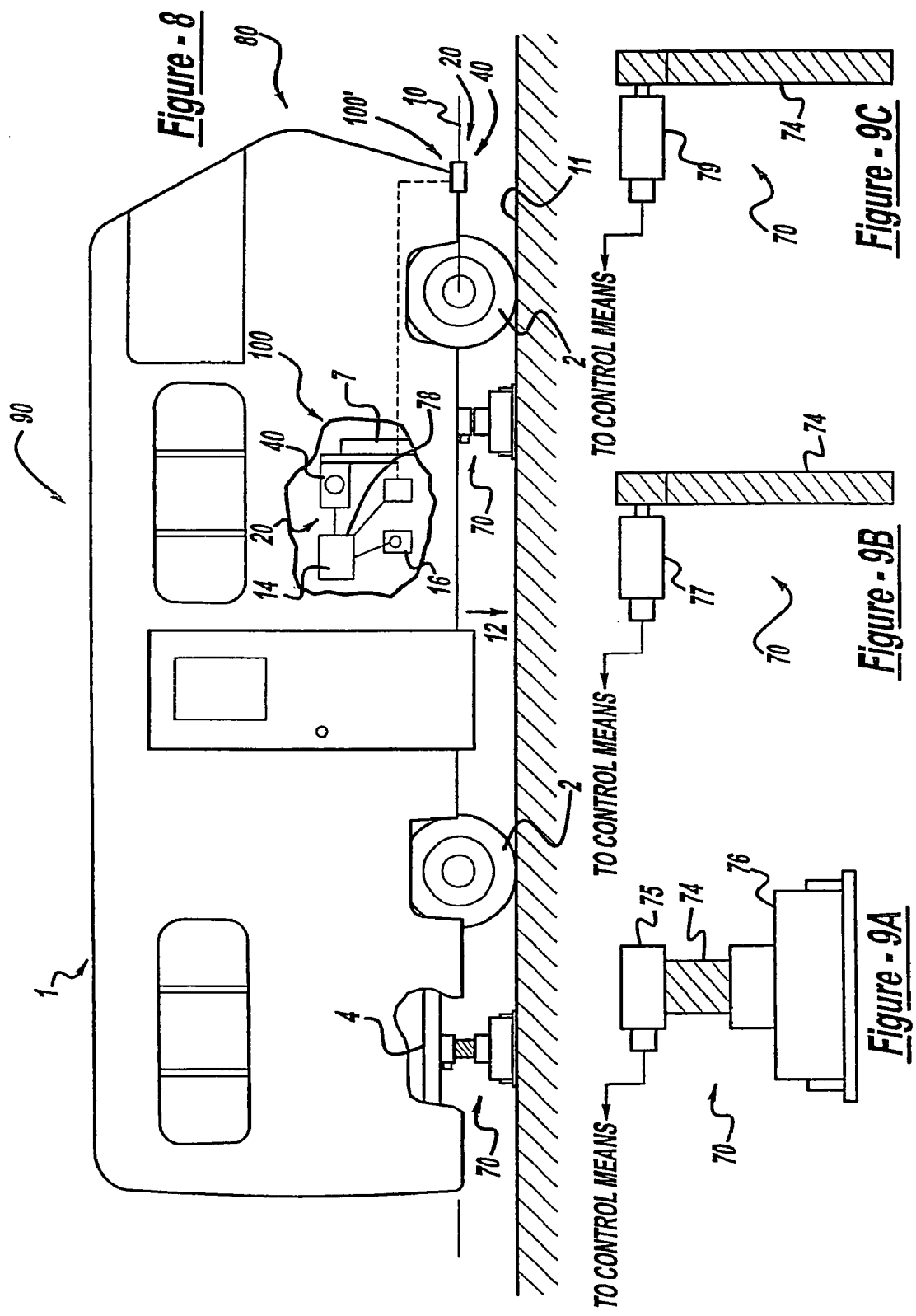

INCLINATION-MEASURING DEVICE

BACKGROUND AND SUMMARY OF THE INVENTION

Devices for measuring the inclination of objects are known in the art. The most common inclination-measuring device is a level vial having a liquid and an air bubble enclosed in a tube. The tube is configured so that the bubble floats to the center of the tube when the level vial is placed on a level surface and floats to the sides of the tube when the vial is placed on an inclined surface.

A major deficiency of this type of device is that it only provides a visual indication of the inclination of the object. Another shortcoming of this device is that it does not provide an output signal suitable for input to other devices such as a controller.

Various devices have been developed in an attempt to solve this problem. For example, electrolytic levels are used as inclination measuring devices by partially submerging electrodes in an electrolyte liquid. As the electrolytic level is tilted, the amount of contact between the electrodes and the electrolyte liquid increases or decreases, thus changing the conductivity of the electrodes. This change in conductivity is converted to a signal representative of the inclination of the object. Unfortunately, this device is sensitive to temperature changes due to the expansion and contraction of the electrolyte liquid. Additionally, the sensitivity of the device can change over time if electrolysis or evaporation reduces the amount of electrolyte in the vial.

Inclination is also measured by using a low-g Micro Electro-Mechanical System (MEMS) accelerometer. Two types of MEMS are currently used. One is based on thermal sensing technology and the other is based on capacitive sensing technology. Both of these technologies are extremely sensitive to variations in ambient temperature. Extreme measures must be taken to calibrate and compensate these sensors for use in an automotive environment. Sensor data collected during the calibration process from the MEMS is used with a temperature-compensating algorithm in conjunction with an Electronic Control Unit (ECU) micro-controller. The micro-controller performs complex calculations and/or table look-ups to convert the acceleration signal into the corresponding inclination. This can be very time consuming when using small micro-controllers because of the lack of floating point math capabilities.

A number of contact sensors have also been proposed for use with inclinometers. One such contact sensor is a potentiometer slider with electrical means. With time, the slider surface wears or corrodes affecting its reliability and thus, contact sensors have not been used extensively in automotive applications.

Pendulum-activated devices have also been proposed to solve this problem. In general, they are simple and easy to fabricate. For example, U.S. Pat. No. 4,426,788 teaches the movement of a pivotally mounted pendulum to display a visual inclination indication. This device does not provide an electrical signal representative of inclination angle. Other pendulum-activated devices are disclosed in U.S. Pat. Nos. 4,887,359; 5,285,031; and 5,821,419. Each of these devices uses an electrically conductive pendulum to control the electrical current through an open and close switch assembly for connection with associated circuitry of a motor vehicle. However, these devices do not provide an electrical signal that varies with the inclination of the motor vehicle and each uses electrical contacts that can become corroded which does affect its reliability.

Thus, there is a need for a pendulum-activated device that uses a non-contacting rotary sensor and provides an electrical signal that varies with inclination, which is reliable, temperature insensitive, inexpensive, and easy to fabricate.

The present invention provides an inclination measuring device for a motor vehicle that includes a pendulum attached to the vehicle and a rotary sensor adjacent the pendulum and operatively connected thereto which is contact-less and produces a signal in response to the inclination of the vehicle.

From the foregoing and the following more detailed description of various preferred embodiments it will be apparent to those skilled in the art that the present invention provides a significant advance in the technology of inclination measuring devices. Particularly significant in this regard is the potential the invention affords for providing a high quality, easy to package, temperature insensitive, reliable, light weight, compact, and low cost inclination measuring device for use in a motor vehicle. Additional features and advantages of various preferred embodiments will be better understood in view of the detailed description provided below.

BRIEF DESCRIPTION OF THE DRAWINGS

These and further features of the present invention will be apparent with reference to the following description and drawings, wherein:

FIG. 4A is a partial cross-sectional view of the upright structure with an aperture to support the sensor; and FIG. 4B is a partial cross-sectional view of an alternate support with a housing.

FIG. 8 is a simplified side view representation of a recreational motor vehicle with a partial cut-away showing the inclination-measuring device adapted for use with a vehicle-leveling system when parked on an irregular surface according to another aspect of the present invention;

FIG. 9A is a simplified representation of the jack stand/outrigger assembly in FIG. 8;

FIG. 9B is a simplified representation of one version of the power unit used for the leveling device in FIG. 8;

FIG. 9C is a simplified representation of another version of the power unit for the leveling device in FIG. 8;

Figure 1:
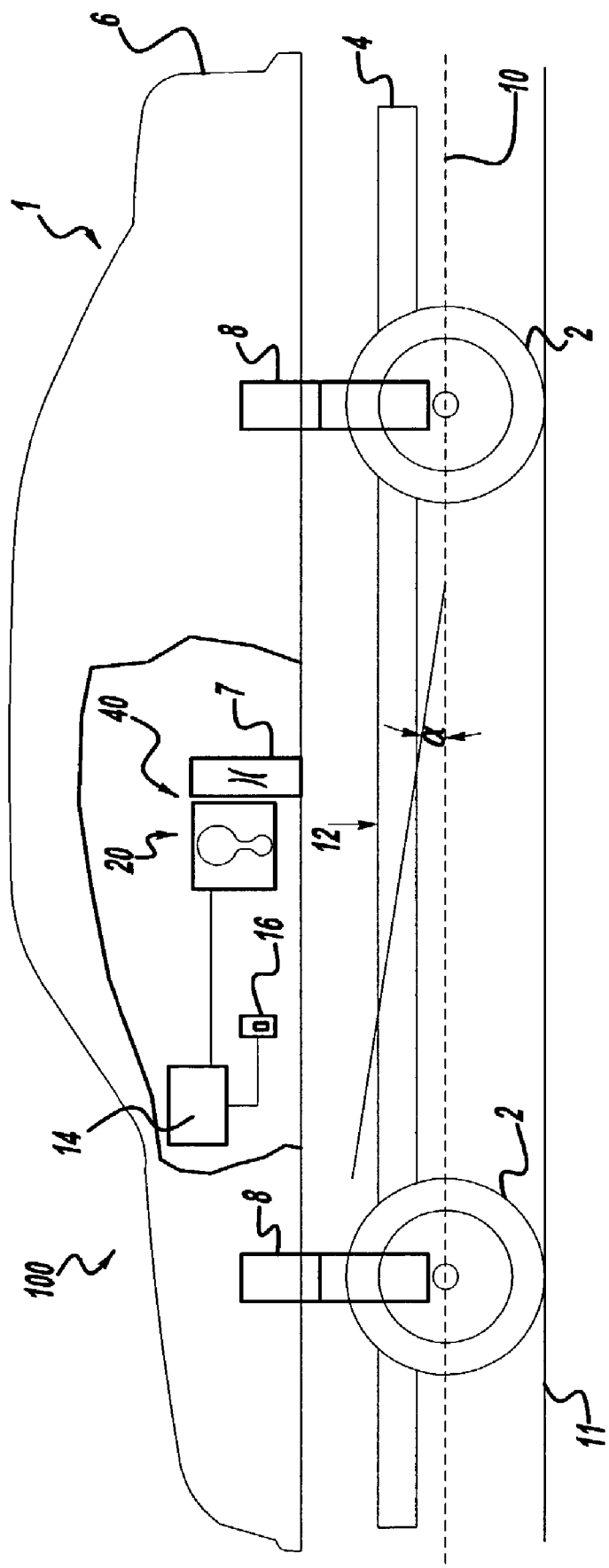
FIG. 1 shows a simplified side-view representation of a motor vehicle with a partial cut-away showing the inclination-measuring device according to the present invention with the body-works separated from the chassis having suspension components.

It should be understood that the appended drawings are not necessarily to scale, presenting a somewhat simplified representation of various preferred features illustrative of the basic principles of the invention. The specific design features of the inclination-measuring apparatus as disclosed herein, including, for example, specific dimensions, orientations, and shapes of the housing and pendulum will be determined in part by the particular intended application and use environment. Certain features of the illustrated embodiments have been enlarged or distorted relative to others to facilitate visualization and clear understanding. In particular, thin features may be thickened, for example, for clarity or illustration. All references to direction and position, unless otherwise indicated, refer to the orientation of the inclination-measuring apparatus illustrated in the drawings. In general, up or upward refers to an upward direction in the plane of the paper in FIGS. 1–5, 8, 11, 12A and 12B and down or downward refers to a downward direction in the plane of the paper in FIGS. 1–5, 8, 11, 12A and 12B.

DETAILED DESCRIPTION OF CERTAIN PREFERRED EMBODIMENTS

It will be apparent to those skilled in the art, that is, to those who have knowledge or experience in this area of technology, that many uses and design variations are possible for the improved inclination-measuring device disclosed herein. The following detailed discussion of various alternative and preferred embodiments will illustrate the general principles of the invention with reference to an inclination-measuring device for use in a motor vehicle. The inclination-measuring device is also illustrated for use with a motor vehicle electric brake system, a vehicle-leveling system that includes a jack stand/outrigger system and a body works-leveling system comprising a lateral leveling system and a vehicle fore and aft or longitudinal leveling system. Other embodiments suitable for other applications will be apparent to those skilled in the art given the benefit of this disclosure.

The inclination-measuring apparatus disclosed herein is designed for use with a motor vehicle, such as an automobile, according to a preferred embodiment of the present invention. While the illustrated embodiments of the present invention are particularly adapted for use with an automobile, it is noted that the present invention can be utilized with any motor vehicle including trucks, buses, motorized coaches, vans, recreational vehicles, campers, personnel carriers, earth moving equipment and the like, and off-road vehicles such as dune buggies, golf carts, sport utility vehicles, industrial equipment and the like.

As best shown in FIG. 1, the inclination-measuring apparatus, according to the present invention, is designated by the numeral 100 and is adapted for use with motor vehicle 1 and includes pendulum 20, and a non-contact rotary sensor 40. Vehicle 1 has a number of known components including but not limited to, for example, a plurality of wheels 2, bodyworks or frame 4, chassis 6, upright or vertical structure 7, suspension system 8 and horizontal plane 10 defined by the axis of wheels 2 when disposed on a substantially horizontal planar and non-inclined surface. When the motor vehicle 1 is on an inclined surface, the vehicle forms an angle α with a longitudinal axis of the vehicle and the ground 11 and an angle β with a lateral axis of the vehicle and the ground 11. The inclination-measuring apparatus 100 generally designates a device that measures the longitudinal inclination of the motor vehicle along the longitudinal axis of the motor vehicle 1. A second inclination measuring apparatus 100' generally designates a device that measures the lateral inclination of the motor vehicle along the lateral axis of the motor vehicle 1. Apparatus 100 and 100' are otherwise identical and only one will be described unless the designation of one or the other aids in the understanding of the invention.

Figure 2:
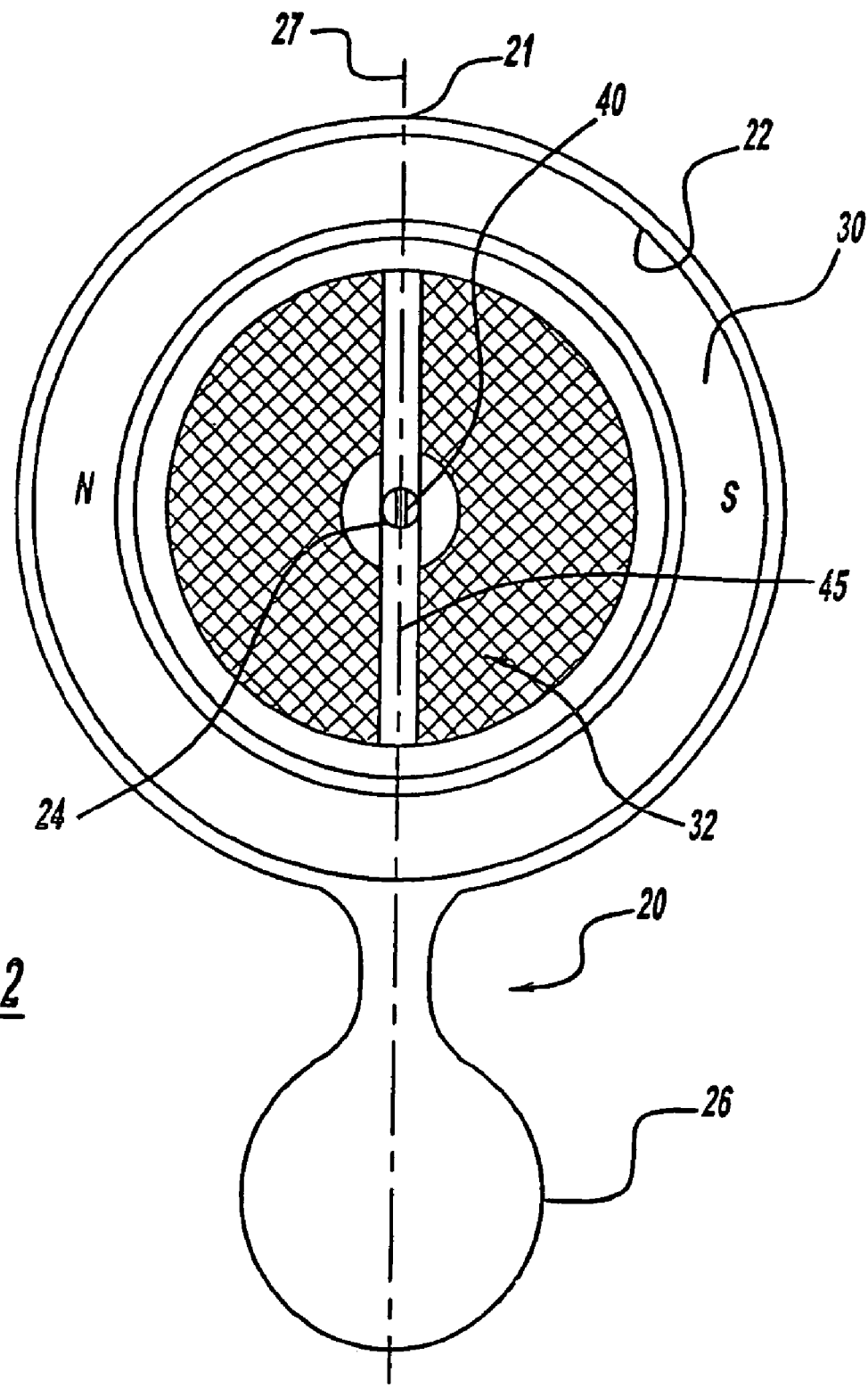
FIG. 2 is a side view of the inclination-measuring device with a pendulum, magnet and flux concentrator, and non-contact rotary sensor according to one aspect of the present invention.

The inclination-measuring device 100 includes pendulum 20, as illustrated in FIG. 2, which has a generally longitudinal member extending from one end 21 toward another or opposite end 29. One end 21 has a portion with an aperture 22 on one side of pendulum 20 and a pivot shaft 24 formed on the other side which is generally aligned along longitudinal axis 27 and generally extending normal to longitudinal axis 27 to enable pendulum 20 to move about pivot shaft 24. The pivot shaft 24 is axially aligned with an axis passing through aperture 22 as defined by axis 25 of pivot shaft 24. Another end 29 has a pendulous mass 26 below pivot axis 25, which has sufficient mass to permit movement or oscillation of pendulum 20 as is well known in the art. One end of pivot shaft 24 is inserted into a hole in the upright structure 7 in chassis 6 so that in one condition, such as when the vehicle is in a non-inclined condition, pendulum 20 hangs generally vertically down and is drawn by its weight in the direction toward the center of the earth. In this condition, longitudinal axis 27 is normally aligned with the earth's gravitational forces 12 and hangs normal to horizontal plane 10. Mass 26 induces movement of pendulum 20 about shaft axis 25 in response to gravitational forces such as in another condition when the vehicle 1 is parked on an incline. Optionally, a low friction bearing 28 is disposed in a hole 9 in structure 7 as shown in FIG. 4A and around shaft 24 to reduce friction between pivot shaft 24 and the hole or further optionally, bearing 28 is disposed around shaft 24 to reduce friction between shaft 24 and the bore 57 in housing 58 (FIG. 3) when the pendulum oscillates in a known manner. The bearing is made of a lubricious material such as, by way of non-limiting example, Teflon which is a trade name for a synthetic resin composed of Polytetrafluoroethylene or similar low friction material. Thus, the pendulum is free to move or oscillate about axis 25 in response to changes in inclination of motor vehicle 1, such as, for example, when the longitudinal axis 27 is no longer normal to horizontal plane 10.

Those skilled in the art will recognize that the pendulous mass must be sufficiently large or heavy to hang generally vertically down in one condition and in another condition to generate sufficient torque to overcome any frictional resistance between the rotating and non-rotating components so as to swing freely. Preferably, pendulum is made of a non-magnetic material, such as for example, aluminum, magnesium, brass, zinc or a composite material. Alternatively, as shown in FIG. 4B, the pivot shaft 24 may be eliminated in pendulum 20 and a smaller aperture 24a formed in a portion of one end 21 so that the aperture 24a has a central axis 25a that is aligned with a projection that extends axially from housing 58 and is aligned with aperture 22 (FIG. 3) for a purpose to be described later on.

Pendulum 20 optionally includes a magnet member 30 that is secured in aperture 22. The illustrated magnet 30 is a ring type. Such ring type magnets are available from Arnold Engineering Company of Marengo, Ill. or Electrodyne Company of Batavia, Ohio. The ring magnet has an outer diameter that cooperatively engages the inner diameter of aperture 22 by any conventional means, such as, for example, a suitable adhesive or fastener. The thickness and width of the ring will vary with the specific application. The magnet generates a magnetic field in a known manner. Further optionally, a flux concentrator 32 may be employed to enhance the strength and direction of the magnetic field of a Hall sensor or device and is disposed in aperture 22 as will be discussed later on.

Rotary sensor 40 is a non-contacting type, which when activated, generates an output voltage signal. A non-contacting sensor is defined as a sensor, which measures relative movement between components without rubbing contact with each other to generate a signal in response to such relative movement. The sensor 40 is mounted to vehicle 1 adjacent pendulum 20 so as to be positioned adjacent rotary shaft 24 which is near the plane of oscillation of pendulum 20 as pendulum 20 is urged by gravity toward the center of the earth. In this position, sensor 40 has a measuring plane 45 that is positioned in its normal operating condition. When urged by gravity, the pendulum 20 oscillates about axis 25 or alternatively about axis 25a as appropriate, and is urged by gravity from a position that is normal to horizontal plane 10 and the measuring plane so that a signal is generated that varies with the oscillation of the pendulum relative to the measuring plane. A control module or controller 14 interprets the output voltage signal from sensor 40.

In practicing the invention, the rotary sensor can be a rotary angle sensor 42 or alternatively, a rotary position sensor 44. Rotary angle sensors 42 are well known and include by way of non-limiting examples: a Model R60D RVIT DC-operated rotary variable inductance transducer manufactured by Schaevitz Sensors of 1000 Lucas Way, Hampton, Va. 23666 as described at www.schaevitz.com and incorporated herein by reference; a Rotary Capacitive Displacement Transducer Angle Sensor that is manufactured by RPD Electrosense of 2216 Pottstown Pike, Pottstown, Pa. 19465 as described at www.rpdelectrosense.com and incorporated herein by reference; and a Series 600 Angular Displacement Transducer that uses differential capacitors and is manufactured by Trans-Tek Incorporated of Route 83, P.O. Box 338, Ellington, Conn. 06029 as described at www.transtekinc.com and incorporated herein by reference. Rotary position sensors 44 are activated by magnets and are well known in the prior art. Rotary position sensors include by way of non-limiting examples: a HMC 1501/1512 Angular/Rotary Position Sensor that is a magnetoresistive sensor and manufactured by the Solid State Electronics Center of Honeywell Magnetic Sensors of Plymouth, Minn. 55441 as described at www.ssec.honeywell.com and incorporated herein by reference; and a Model MLX90215 Programmable Linear Hall-Effect Sensor manufactured by Melexis of 41 Locke Road, Concord, N.H. 03301 as described at www-.melexis.com and incorporated herein by reference. Other sources for Hall-Effect sensors are Allegro Microsystems, Micronas and Honeywell.

When using a rotary angle sensor 42, the sensor is fixedly mounted in an aperture or hole 9 in the upright structure 7 so that the rotor of sensor 42 extends along its axial axis normal to the surface of structure 7. The rotary angle sensor 42 is inserted into aperture 52a and the shaft of the sensor is inserted into aperture 24a in pendulum 20. In this position, the axis of the shaft of sensor 42 and the axis of aperture 24a are aligned. When pendulum 20 moves, it rotates the shaft of sensor 42. The movement of the shaft of sensor 42 by the pendulum is converted by conventional electronic circuitry to produce a DC voltage output signal that is proportional to the shaft angular displacement of the sensor in a well-known manner. When using a rotary position sensor 44, pendulum 20 is pivotally mounted about shaft 24 adjacent but spaced from sensor 44 and magnet 30 as described earlier. In practicing the present invention, the rotary position sensors described herein are more commonly identified as magnetic field strength and magnetic field direction sensors, which have been adapted for use in the present invention as position sensors. Sensor 44 is activated when the lines of magnetic field, formed by magnet 30 in a known manner, move or oscillate relative to the measuring plane 45 of the sensor so that the sensor generates an output voltage signal. A magnetoresistive sensor measures magnetic field direction and a Hall Effect sensor measures magnetic field strength. The output voltage signal of sensor 40 is processed by the controller that sends an appropriate signal to a vehicle control device or alternatively to a display device (not shown) mounted on the dashboard (not shown) of the vehicle.

Figure 3:
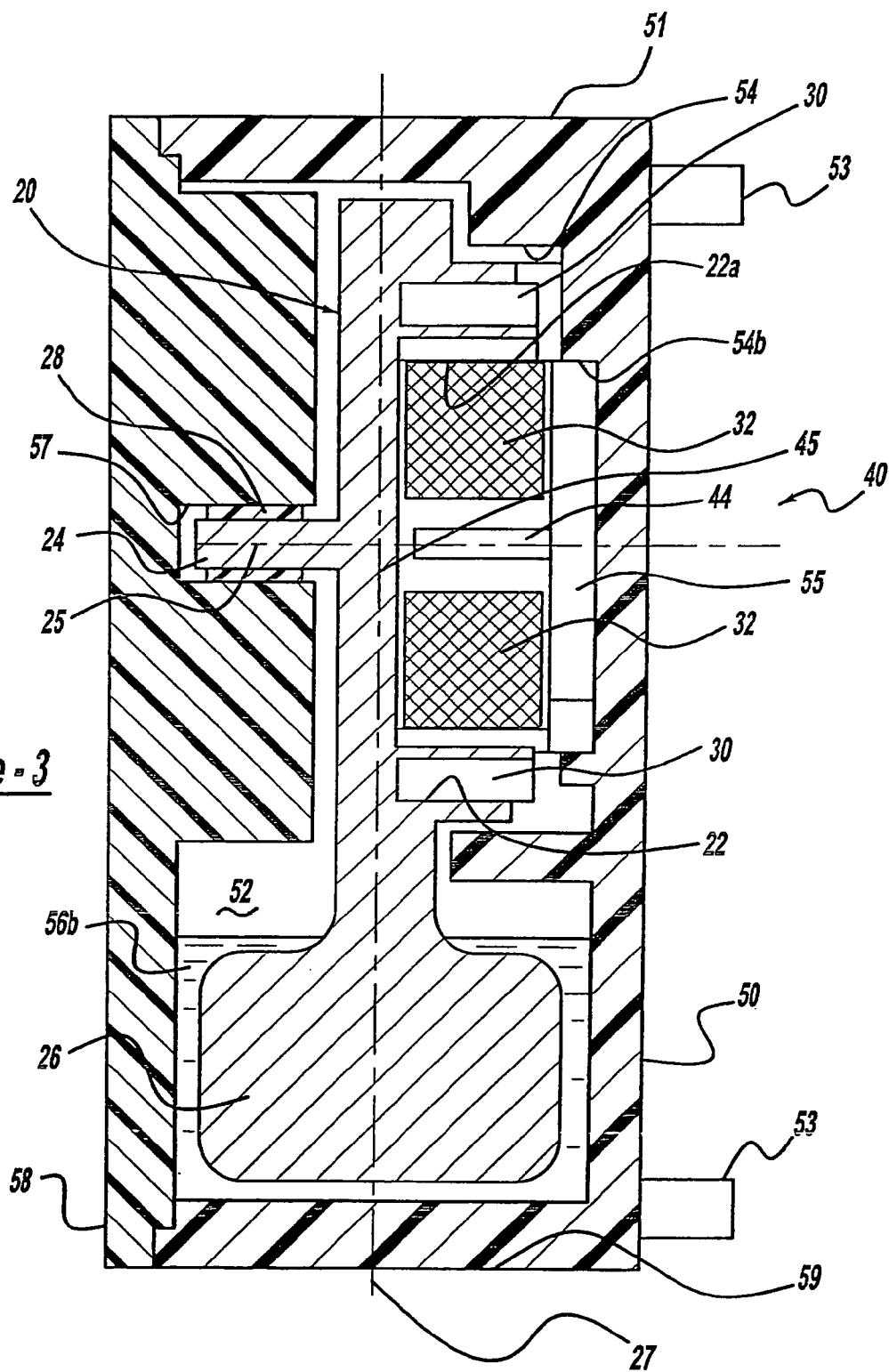
FIG. 3 is a cross-sectional view of an optional embodiment of the inclination-measuring device including a housing enclosing a pendulum, magnet, flux concentrator and a non-contact rotary angle sensor according to another aspect of the present invention.

Optionally, it may be desirable to protect pendulum 20 and sensor 44 from debris, dirt and corrosion with housing 50 as shown in FIG. 3. The illustrated housing is formed with an internal cavity 52 and is longitudinally elongated to accommodate the oscillation of pendulum 20 therein. Housing 50 includes a first or longitudinally extending wall, a top wall 51, a bottom wall 59 and a pair of sidewalls. A cavity 54 is formed in the first wall. Housing 50 has pair of locating pins 53 that extend from the first wall to facilitate mounting the housing to chassis 6 or upright structure 7. Cover 58 encloses the cavity 52 to protect pendulum 20 and sensor 44. Preferably, the housing is made of thermoplastic, thermoset plastic, aluminum or other non-conducting, non-magnetic metal or polymer or composite material.

Figure 4:
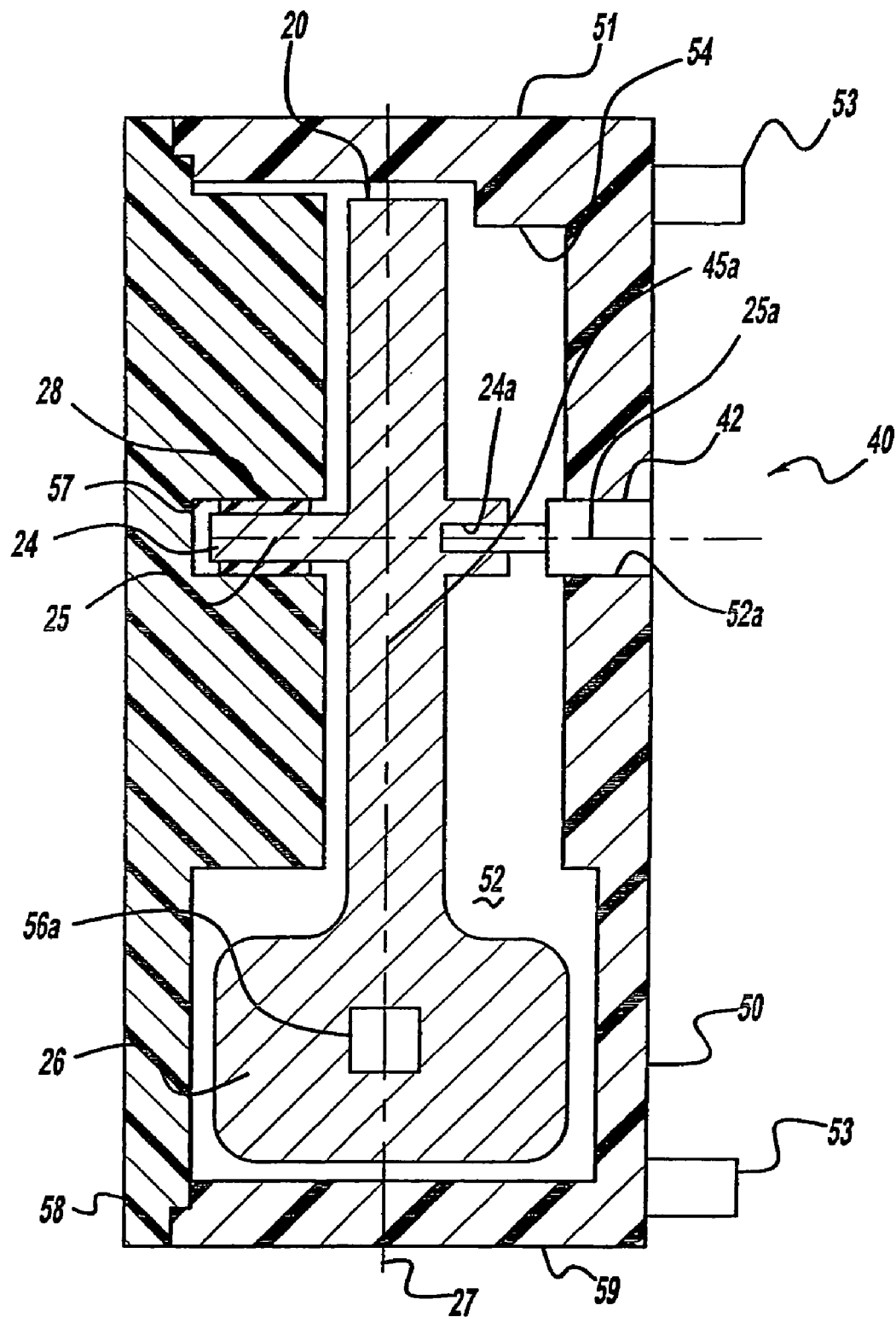
FIG. 4 is a cross-sectional view of a still another aspect of the inclination-measuring device including a housing enclosing a pendulum and a non-contact rotary position sensor according to the present invention.
Figure 5:
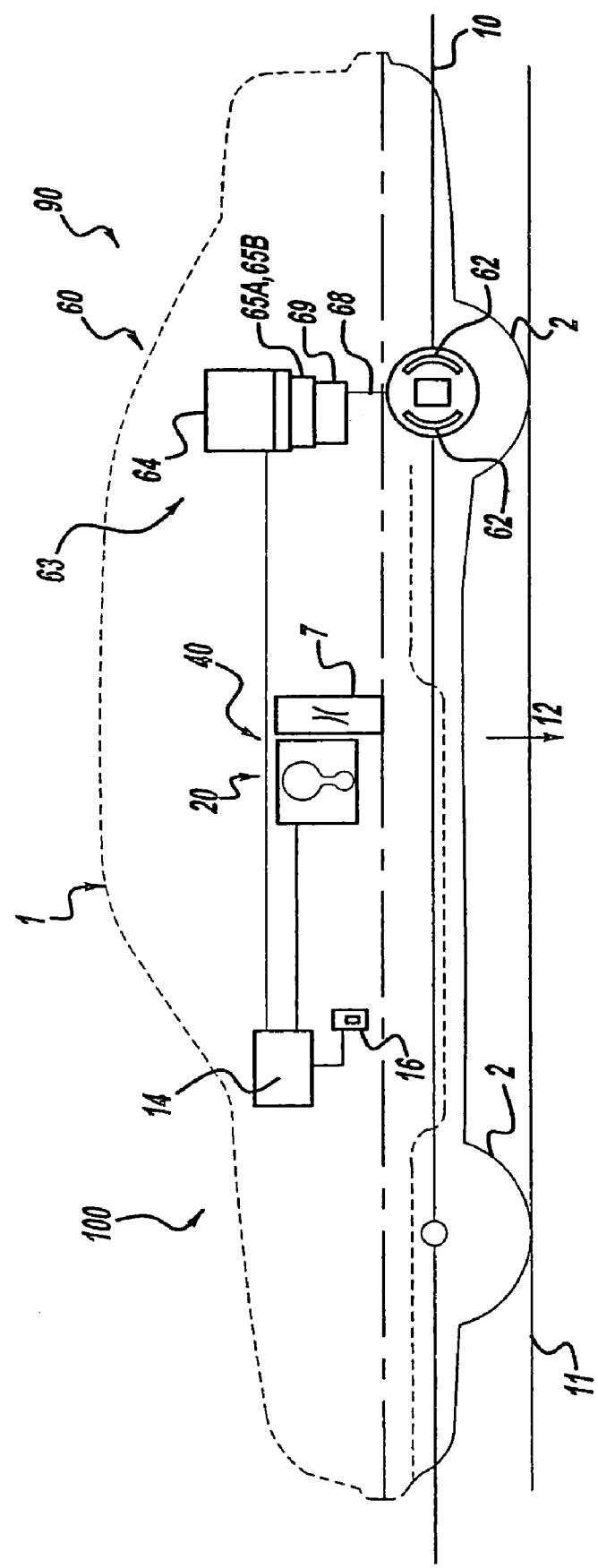
FIG. 5 is a simplified side-view representation of a motor vehicle showing the inclination-measuring device according to the present invention adapted for use with an electric park brake.
Figure 6:
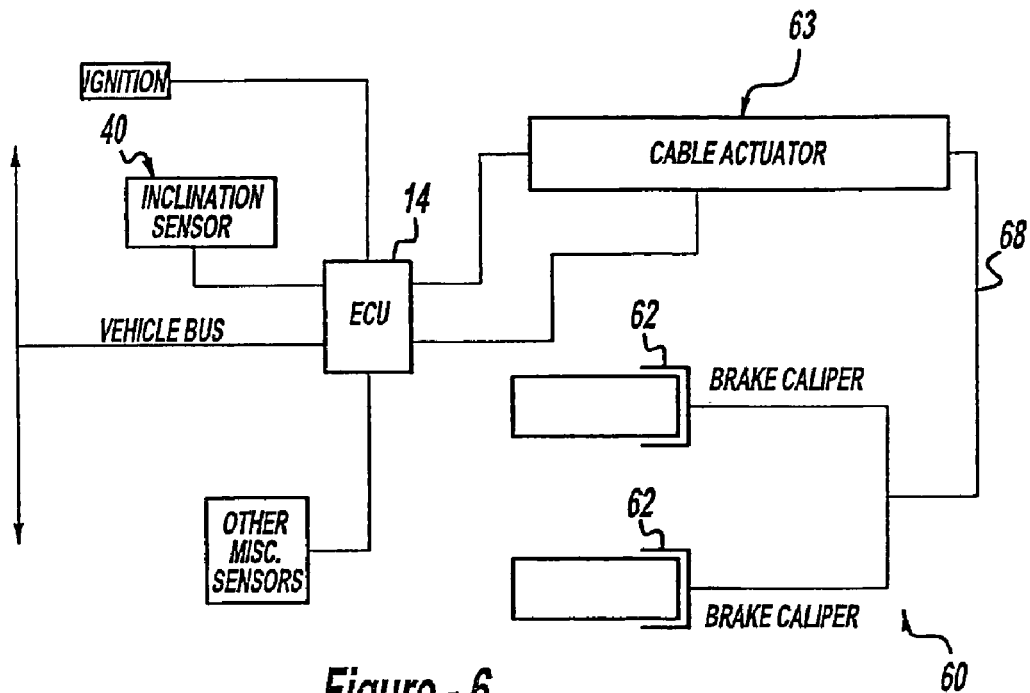
FIG. 6 is a schematic representation of the inclination-measuring device adapted for use with an electric park brake system with a cable actuator.

As shown in FIG. 4, when rotary angle sensor 42 is used in practicing the invention, the body of rotary angle sensor is disposed in cavity or aperture 52a of housing 50. The axial shaft of sensor 42 is aligned with central axis 25 of shaft 24. Sensor 42 is fastened in aperture 52a in the first wall by conventional fastening methods. Sensor 42 has electrical terminals or leads (not shown) that extend from the body of the sensor through a separate hole (not shown) or aperture 52a in the first wall to the exterior of housing 50. The pendulum 20 is conventionally attached to the rotor of sensor 42, as described earlier, to rotate about the shaft of the sensor and shaft 24 as will be described later on. Optionally, sensor 42 may be used with pendulum 20 without the use of housing 50 and in this event; sensor 42 is conventionally fastened to chassis 6 or upright structure 7.

Returning back to FIG. 3, when a rotary position sensor 44 is used in practicing the invention, a printed circuit board 55 is disposed in aperture 54b in the first wall and fastened thereto by conventional fastening methods. Sensor 44 has electrical terminals that extend from the circuit board 55 through a hole in the first wall to the exterior of housing 50. Sensor 44 is mounted to housing 50 so as to be aligned with axis 25 to allow the magnet and pendulum to move in close proximity to the body of sensor 44. The interior surface of cover 58 has a pilot bore 57. Pivot shaft 24 is inserted into the bore 57 to permit pendulum to move or oscillate about shaft axis 25. Ring magnet 30 is positioned adjacent but spaced apart from the first wall. Optionally, sensor 44 is fastened to the electrical terminal or control board. The measuring plane 45 of sensor 44 extends normal from the electrical terminal and the first wall toward pendulum 20 but spaced away there from and centrally with shaft axis 25.

Flux concentrator 32 is inserted into aperture 22a so that it surrounds sensor 44 and is connected to the pendulum 20 by conventional means but it is in close proximity but spaced away from sensor 44. Optionally, a low friction bearing 28a is inserted into bore 57 to reduce friction between shaft 24 and bore 57. Bearing 28a is preferably made of a lubricious material such as Teflon or other similar low friction material suitable for the application as discussed earlier. To reduce the amplitude of the oscillation of pendulum 20, a dampening member is used. One such dampening member is a pair of pads 56a formed of a visco-elastic material, for example, a natural or synthetic elastomer, such as for example, butyl rubber. Each pad 56a is attached to one of the sides of pendulous mass 26 to prevent the mass from contacting the sidewalls of the housing. Alternatively, the dampening material is a liquid 56b such as natural or synthetic oil that is disposed in the cavity 52 near the pendulous mass 26. When the amplitude of the pendulum causes the mass to oscillate toward one or both sidewalls of the housing, the dampening member prevents contact with the sidewalls and reduces the amplitude of the swing of the mass, such as for example, when one of the wheels of the motor vehicle hits an obstruction or a pothole.

In operation, the inclination-measuring device 100 has a pendulum 20 fastened to the chassis or other structure such as for example, upright structure 7 with the motor vehicle in a parked condition and a non-inclined position, that is, when the horizontal plane of the vehicle is normal to the ground and normal to the earth's gravitational forces. Optionally, the pendulum is disposed in housing 50 and the housing is attached to vertical structure 7 or any other suitable support structure in the motor vehicle. In this condition, pendulum 20 and sensor 40 are in a non-activated or normal operating condition, that is, the pendulum is not rotating about its axis and not angularly disposed relative to the measuring plane of the sensor. Thus, the pendulum does not activate the measuring plane of the sensor, as the longitudinal axis of the pendulum is normal to the horizontal plane, aligned with the earth's gravitational forces and normal to the measuring plane 45. When the vehicle is on an inclined surface, the longitudinal axis of the pendulum rotates the shaft of rotor of sensor 42 relative to the measuring plane 45 to produce a signal that is processed by the controller 14 for a purpose to be described later on. Alternatively, sensor 44 is activated when the longitudinal axis of the pendulum moves angularly with respect to the measuring plane 45 of sensor 44. The movement of the magnet in the pendulum causes the magnetic field to move in close proximity to sensor 44 so that it generates an output voltage signal that is interpreted by controller 14.

Figure 7A:
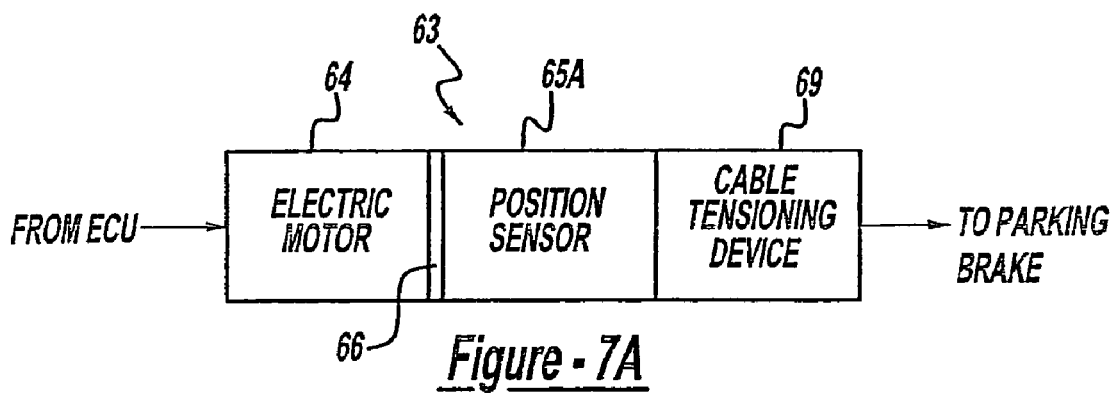
FIG. 7A is a schematic representation of one version of the cable actuator of FIG. 6.
Figure 7B:
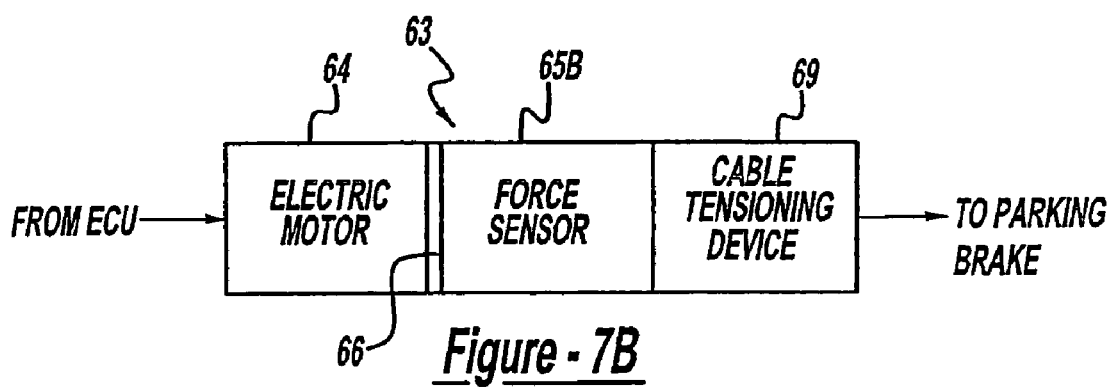
FIG. 7B is a schematic representation of another version of the cable actuator of FIG. 6.
Figure 10:
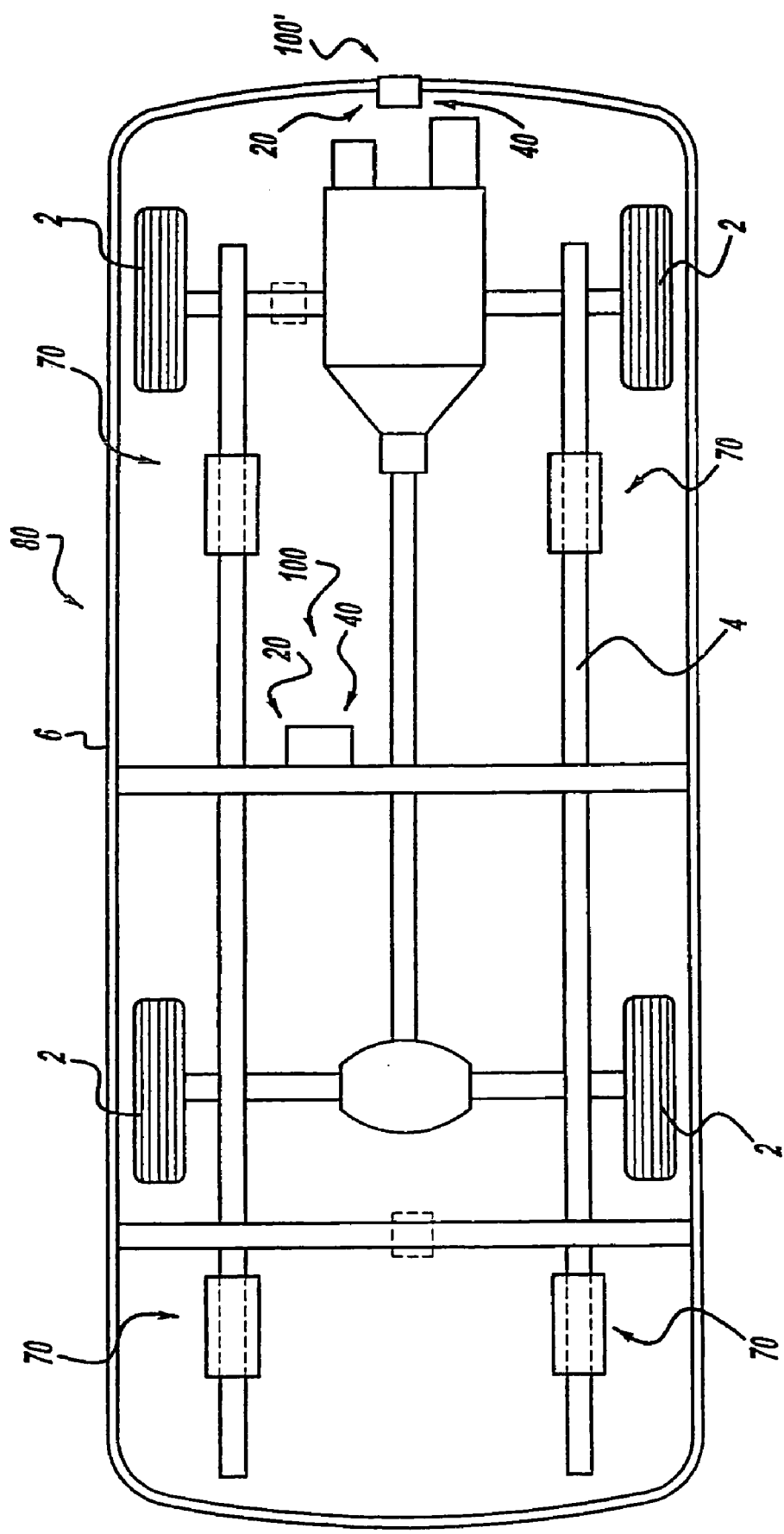
FIG. 10 is a bottom view of FIG. 8.

The inclination-measuring device or inclinometer 100 can be advantageously used to adjust the force applied to an electric park brake 60 as shown in FIGS. 5, 6, 7A and 7B. It is known in the art to provide electric-motor driven brake systems. For example, see U.S. Pat. Nos. 4,281,736, 4,561, 527, 4,629,043, 4,795,002, 4,865,165, 5,004,077, 5,180,038, 5,485,764, 5,542,513, and 5,590,744 which each disclose an electric motor-driven brake system, the disclosures of which are expressly incorporated herein in their entirety by reference. Electric park brake 60 includes a cable actuator 63 including electric motor 64 with an output shaft, a transmission 66 with a lead screw coupled to the shaft for operative movement therewith and of cable tensioning device 69. The brake device has a pair of brake calipers 62 that are connected to the cable 68 to apply a tension force to set the brakes. Controller 14 through the cable actuator actuates the electric park brake. When applying the brakes, the control module is adapted to stop the rotation of the electric motor when a predetermined tension signal is sensed in the cable. Cable tension is determined by measuring cable travel using a position encoder or motor current using a shunt. Cable actuator 63 measures and controls cable tension indirectly with position sensor 65A, as shown in FIG. 7A and in U.S. patent application Ser. No. 09/728,174, filed on Dec. 1, 2000, the disclosure of which is expressly incorporated herein. Alternatively, cable actuator 63 measures cable tension directly with force sensor 65B, as shown in FIG. 7B and in U.S. patent application Ser. No. 09/974,133, filed on Oct. 9, 2001, the disclosure of which is expressly incorporated herein.

Normally, when the motor vehicle is parked or stopped on a level or non-inclined surface, the electric park brake is only partially applied at some minimum level of tension or force in the brake cable attached to each of the brake calipers 62. However, when the vehicle is parked or stopped on an inclined surface, the level of tension or force in the brake cable must be increased to a sufficient level to maintain or hold the vehicle at that inclined level or grade to prevent the vehicle from moving or rolling. Alternatively, the force level applied to the brake cable may be made adjustable with increasing grade or inclination level or proportional to the grade or one or more force levels sufficient to set the brake force to different levels of vehicle inclination.

Inclination-measuring device 100 produces a signal that is proportional to the inclination of the vehicle and is useful in adjusting the force applied to the brake calipers 62. Thus, as pendulum 20 rotates the shaft of sensor 42 relative to the measuring plane to produce a signal or alternatively sensor 44 is activated when the longitudinal axis of the pendulum moves angularly relative to the measuring plane of sensor 44 to produce a signal. The signal is processed by the controller 14 which sends a signal to cause the electric park brake 60 to apply a force or tension in the brake cable and to the brake calipers in response to the inclination of the vehicle on the grade or incline. As stated earlier, the force is adjustable in response to the inclination of the vehicle, or optionally, in proportion to the inclination of the vehicle. Alternately, the force to the brake cable can be set at multiple inclination threshold force levels depending on the vehicle inclination or varied by a fixed constant or variable relationship depending on the inclination of the vehicle.

By applying the park brake to a vehicle with an inclination appropriate load, the durability of the park brake actuator and the electric park brake assembly is improved. Another benefit of the present invention is that by applying an inclination appropriate load or tension allows the park brake to release faster when the vehicle is parked or stopped on a level surface. If the vehicle is equipped with a drive-away-release function in the park brake system in a known manner, the drive-away-release function reduces brake drag and it reduces the possibility of vehicle rollback. During operation of a drive-away-release device 90, the controller 14 detects conditions in the electric park brake through other sensors that indicate when the driver is attempting to drive away and releases the electric park brake in a well-known manner.

In yet another embodiment of the present invention, a pair of inclination-measuring devices 100, 100' produce signals that are useful in a vehicle-leveling device 80 such as a stabilizing apparatus including a jack stand/outrigger assembly 70 adapted for use with vehicle 1. Assembly 70 is advantageously used by of non-limiting example, a motor home or camper to level and stabilize the vehicle when the vehicle is parked on irregular terrain preparatory to camping or similar activity as shown in FIGS. 8, 9A, 9B, 9C and 10. Such stabilizing devices are disclosed in U.S. Pat. Nos. 4,784,400 and 4,887,359, the disclosures of which are incorporated herein by reference by their entirety. Vehicle 1 is equipped with a plurality of jack stand assemblies 70 at suitable locations of the vehicle. Each assembly 70 has a leg and includes a toothed rack 74, a plurality of double-acting power units 75 for extension or retraction of each leg and base plate 76, control means 78 for controlling each of the power units 75, a plurality of control switches operable with the control means 78, ON-OFF switch 16 connected to the controller 14 and a pair of inclination-measuring devices 100, 100' connected to the controller 14. The power units may be powered electrically or alternately powered by a fluid. The electrically powered unit includes an electric motor 77 with a pinion gear to engage a toothed rack 74 for extension or retraction of each leg as is well known in the art. Alternately, the powered units 75 include a rotary hydraulic motor or rotary pneumatic motor 79 with a pinion gear to engage toothed rack 74 for the extension or retraction of each leg as is known in the art or optionally, a rotary pneumatic device. Rotary hydraulic motors are conventional and available from Hoerbiger of Germany or Power Packer of Germany. Rotary pneumatic motors are conventional and known in the art. Each of the power units 75 is powered by a suitable power source; such as for example, fluid or electricity as is appropriate in a known manner. At least one inclination-measuring device 100' is located on a lateral plane of the vehicle when it is parked on a level surface such as by way of non-limiting example, the lateral bumper of the vehicle or other suitable location. At least one other device 100 is located on a vertical plane of the vehicle when it is parked on a level surface which is normal to a horizontal plane 10, such as by way of non-limiting example, a vertical or upright member 7 of the vehicle. Alternatively, both devices can be located within the control unit provided that the control unit is appropriately oriented in the motor vehicle.

In use of the jack stand assemblies, the motor vehicle operator selects a likely camping site and parks the vehicle. ON-OFF switch 16 is energized and this causes a signal to be sent to controller 14. Each of the jack stand assemblies 70 is activated by a signal from controller 14 to control means 78 in a known manner to engage ground 11. In the event that the vehicle is parked on an inclined or irregular surface, signals responsive to the inclination of the vehicle from devices 100 100' as described earlier, are processed by the controller 14 to operate control means 78 50 that each jack assembly 70 is extended or retracted until a level condition is achieved in a lateral plane of the vehicle and a longitudinal plane of the vehicle. Before moving the vehicle, the operator retracts each of the jack assemblies 70 to a non-operable condition.

Figure 11:
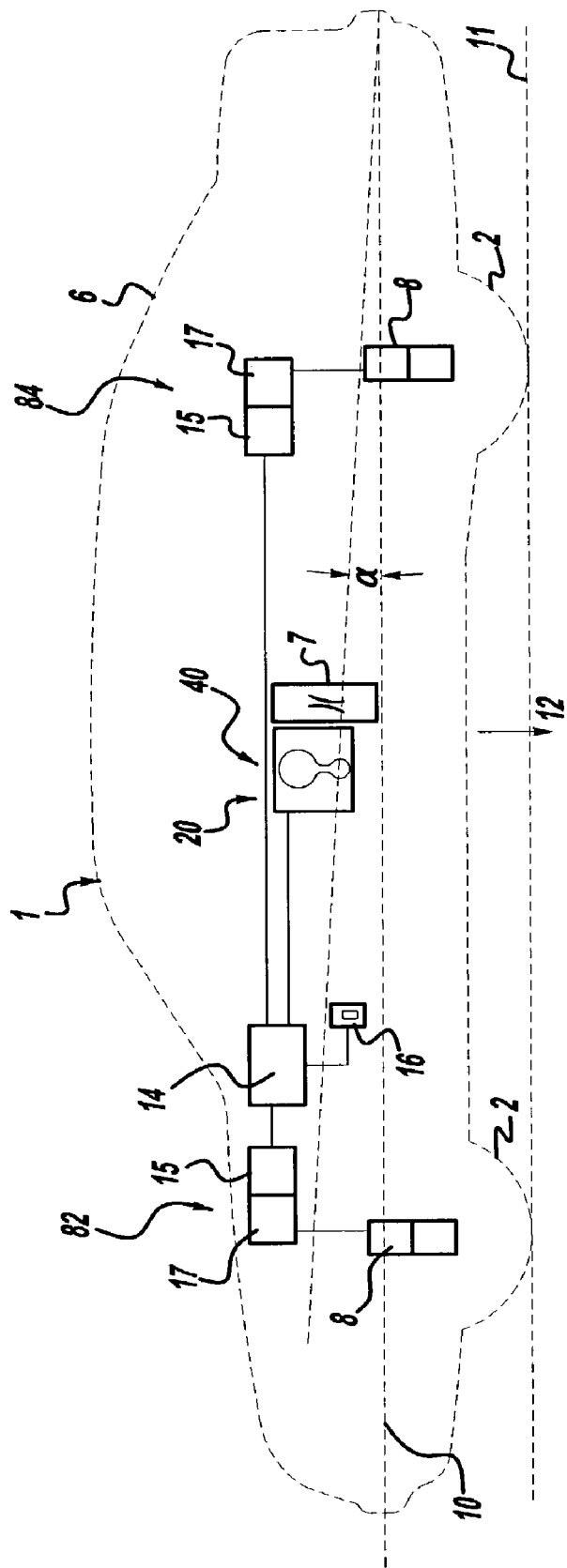
FIG. 11 shows a simplified side-view schematic representation of a motor vehicle with the inclination-measuring device according to the present invention adapted for use with the vehicle suspension system to control the motor vehicle inclination laterally and longitudinally during operation.
Figure 12A:
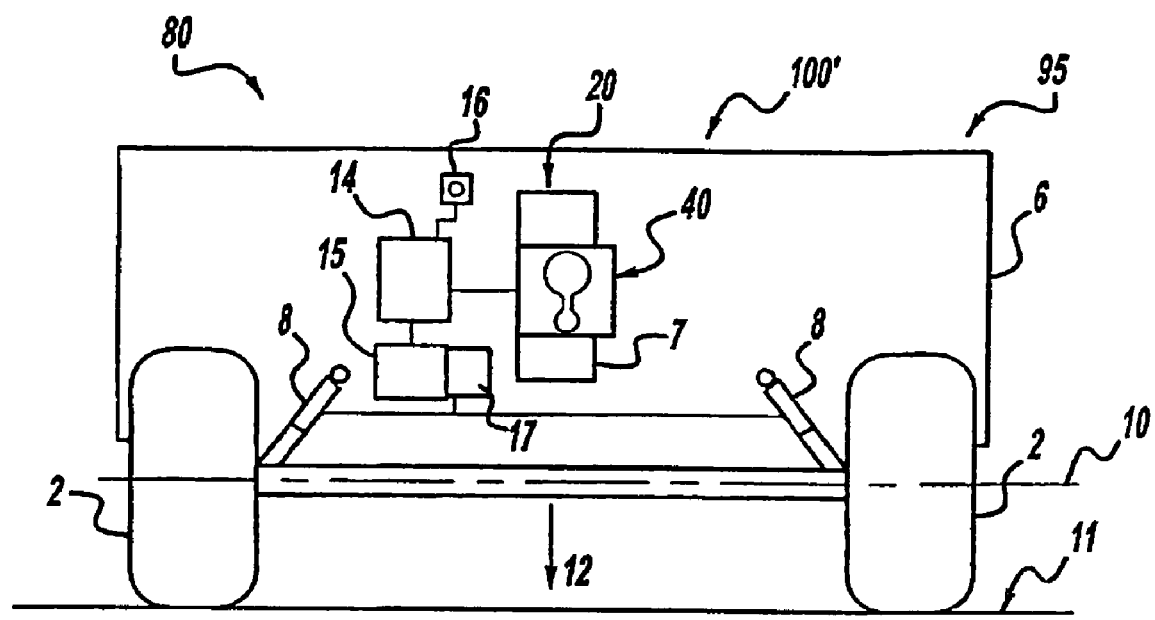
FIG. 12A shows a simplified rear-view representation of a motor vehicle on a level surface with the inclination-measuring device of FIG. 11.
Figure 12B:
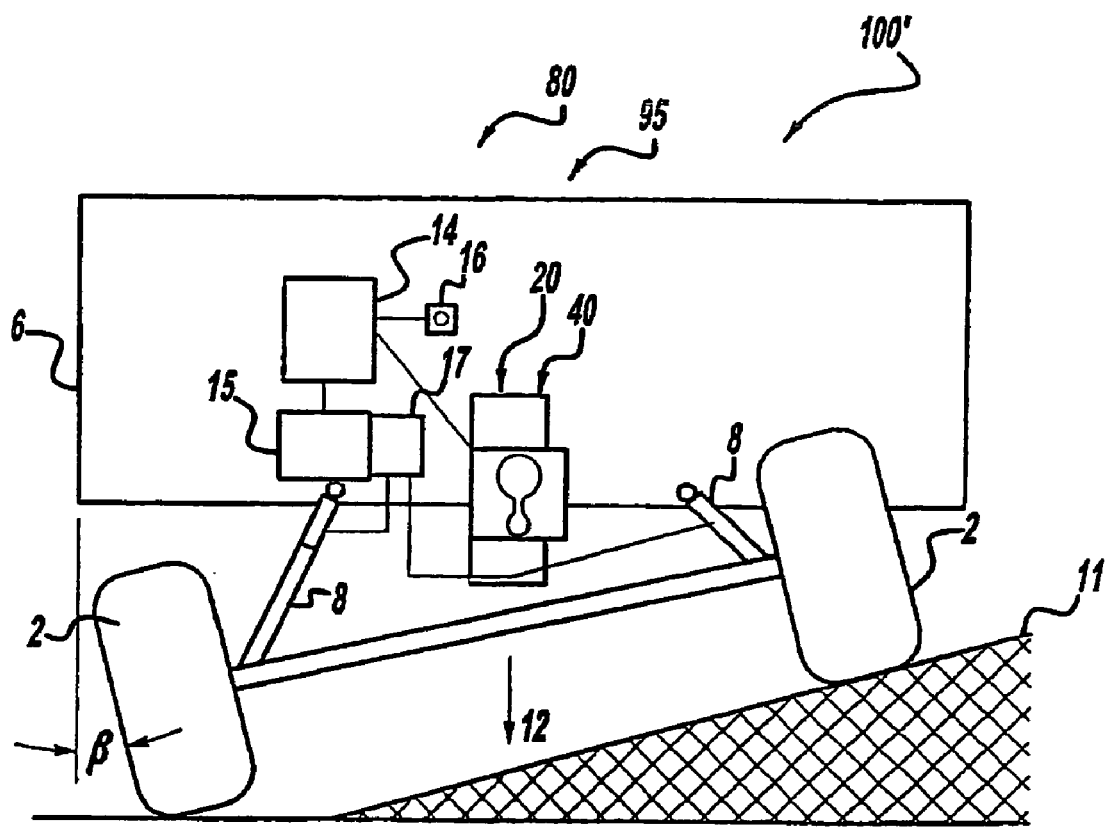
FIG. 12B shows a simplified rear-view representation of a motor vehicle on an inclined surface with the inclination-measuring device of FIG. 11.

In still yet another embodiment of the present invention, the inclination-measuring devices 100, 100' are used to provide a first signal representing the longitudinal inclination angle $\alpha$ and a second signal representing lateral inclination angle $\beta$ of vehicle 1 for the control of the attitude of the vehicle relative to the ground 11 during operation of the vehicle as shown in FIGS. 11, 12A and 12B. In this embodiment, the vehicle-leveling device 80 includes a body-leveling device 95.

Body leveling device 95 has at least one hydraulic actuator 82 for longitudinal axis control of the vehicle and at least one other hydraulic actuator 84 for lateral axis control of the vehicle. Hydraulic actuators 82, 84 are identical and each includes a reservoir 17 for hydraulic fluid, a pump 15 connected to the reservoir, a plurality of control valves (not shown) connected to the pump, variable extension elements connected to the control valves and a plurality of hydraulically actuated ride control devices with variable extension elements are connected to assist their respective suspension component of system 8 in a known manner. Each ride control device is connected to the frame 4 and the chassis 6 to assist a conventional hydraulic suspension component of system 8 in controlling the longitudinal inclination angle $\alpha$ of chassis 6 relative to the ground 11 during operation of the motor vehicle. By way of non-limiting examples, body leveling device 95 may be used advantageously when the weight of a trailer on the rear bumper of a motor vehicle causes the front end of the vehicle to pitch upwardly relative to the rear bumper to control the longitudinal angle $\alpha$. Similarly, device 95 is used to control the lateral angle 13 relative to the ground 11 in the event of a lateral load shift in the vehicle or trailer during its operation which can cause the chassis 6 to pitch to one side relative to another side in a known manner. Alternatively, body-leveling device 95 may use electric actuators and switches to operate electrically actuated variable extension elements in a known manner to control the longitudinal and lateral inclination or attitude of the chassis relative to the body. Further optionally, body-leveling device 95 may employ a pneumatic actuator to operate a pneumatic actuated variable extension element to control longitudinal and lateral attitude of the vehicle during operation.

In operation, one inclination-measuring device 100 produces a signal that is proportional to the inclination of the vehicle and activates body-leveling device 95 in order to control the longitudinal attitude of the chassis relative to the body or frame. Alternately, another device 100' located on lateral plane of the motor vehicle produces a signal to activate body-leveling device 95 in order to control the lateral attitude of the chassis relative to the body or frame. Thus, in response to an inclination of the vehicle, pendulum 20 rotates the shaft of sensor 42 to produce a signal or alternatively sensor 44 is activated when the axis of the pendulum moves angularly relative to sensor 44 and the normal operating position of the sensor to produce a signal. With device 100, a signal is processed by the controller 14 that sends a signal to cause body-leveling device 95 to adjust the longitudinal angle $\alpha$ toward a non-inclined longitudinal attitude. With device 100', a signal is processed by the controller that sends a signal to cause body-leveling device 95 to adjust the lateral angle to a non-inclined lateral attitude. The signal from the controller may be in response to the inclination of the vehicle due to its operation on a grade or an inclined surface or in proportion to the longitudinal inclination of the vehicle or in proportion to a shift in lateral inclination due to the operation of the vehicle on an uneven or irregular surface or due to a lateral shift in load in the vehicle or trailer during its operation. Alternately, the signal may be triggered in response to an inclination threshold level, either longitudinal or lateral, depending on the vehicle inclination or varied by a fixed constant or variable relationship depending on the inclination of the vehicle.

From the foregoing disclosure and detailed description of certain preferred embodiments, it will be apparent that various modifications, additions and other alternative embodiments are possible without departing from the true scope and spirit of the present invention. For example, it will be apparent to those skilled in the art, given the benefit of the present disclosure, that the inclination measuring device can each have many different configurations and can be formed in many different manners such as the pendulum may be formed of a weight/mass suspended from wires, or the sensor may be mounted in the controller 14. The embodiments discussed were chosen and described to provide the best illustration of the principles of the present invention and various practical application to thereby enable one of ordinary skill in the art to utilize the invention in various embodiments and with various modifications as are suited to the particular use contemplated. For example an optical measuring device can be used instead of the sensors described herein. All such modifications and variations are within the scope of the present invention as determined by the appended claims when interpreted in accordance with the benefit to which they are fairly, legally, and equitably entitled.

The invention as claimed is:

1. A parking brake apparatus for use with a vehicle, the apparatus comprising, in combination;
   a non-contacting, rotary, hall effect sensor;
   a pendulum member pivotally mounted adjacent to the hall effect sensor, the pendulum member having a pendulous mass and a portion forming an aperture, the hall effect sensor disposed in the aperture of the pendulum member;
   a magnet member disposed in the aperture of the pendulum member so that the magnet member can activate the hall effect sensor when the pendulum member is angularly displaced to generate an inclination signal that varies with the inclination of the pendulum member;
   a controller coupled to the sensor to process the inclination signal; and
   a parking brake having an actuator to set the parking brake, the controller coupled to the actuator for sending a brake setting signal to the actuator that is related to the inclination signal.

2. The parking brake apparatus of claim 1, wherein the controller controls the actuator when a vehicle is stationary to set the parking brake at a predetermined brake force that is based on vehicle inclination, with more brake force the greater an inclination so as to hold a vehicle without moving.

3. The parking brake apparatus of claim 1, wherein the parking brake further includes a cable, at least one brake caliper connected to the cable, the actuator connected to the brake caliper to set the parking brake, and a cable tension device, the cable tension device measuring the tension force in the cable when the parking brake is being set, the controller coupled to the actuator for sending a brake setting signal to the cable actuator to set the parking brake with a force that is related to the inclination signal with more brake force being applied for a greater inclination.

4. An inclination measuring apparatus for use with a vehicle, the apparatus comprising, in combination:
   a housing;
   a pendulum member pivotally disposed in the housing, the pendulum member having a pendulous mass and a portion forming an aperture;
   a non-contracting, rotary, hall effect sensor disposed in the aperture of the pendulum member;
   a magnet member disposed in the aperture of the pendulum member so that the magnetic member can activate the hall effect sensor when the pendulum member is angularly displaced to generate an inclination signal that varies with the inclination of the pendulum member; and
   a controller coupled to the hall effect sensor to process the inclination signals.

5. The inclination measuring apparatus of claim 4, wherein the pendulum member is supported by a pivot shaft, and the pivot shaft is axially aligned with the aperture.

6. The inclination measuring apparatus of claim 5, further including a bearing supported by the housing, and wherein the pivot shaft is supported by the bearing.

7. The inclination measuring apparatus of claim 4, wherein the pendulum member is made of non-magnetic material.

8. The inclination measuring apparatus of claim 4, further including a flux concentrator disposed in the aperture and connected to the pendulum member, a printed circuit board disposed in the housing and fastened to the hall effect sensor, a pivot shaft, wherein the pendulum member is supported by the pivot shaft, the pivot shaft is axially aligned with the aperture, the magnet member is secured in the aperture of the pendulum and the hall effect sensor is aligned with a central axis of the pivot shaft.

9. The inclination measuring apparatus of claim 4, wherein the magnet member includes a ring magnet with an outer diameter that engages an inner diameter of the aperture.

10. The inclination measuring apparatus of claim 4, wherein the apparatus further includes a flux concentrator disposed in the aperture and connected to the pendulum member.

11. The inclination measuring apparatus of claim 4, wherein the pendulum member is supported by a pivot shaft, and the hall effect sensor is aligned with a central axis of the pivot shaft.

12. The inclination measuring apparatus of claim 4, further including a printed circuit board disposed in the housing and fastened to the hall effect sensor.

13. The inclination measuring apparatus of claim 4, further including a liquid dampening material, wherein the housing has a portion forming a cavity for the pendulous mass and the liquid dampening material is disposed in the cavity about the pendulous mass.

14. The inclination measuring apparatus of claim 4, wherein the controller processes a signal from the hall effect sensor to activate a parking brake.

15. The inclination measuring apparatus of claim 4, wherein the controller processes a signal from the hall effect sensor for controlling a vehicle-leveling device.

* * * * *